Feb. 23, 1971 G. K. HAUSE 3,564,938
TRANSMISSION AND CONTROL
Filed April 11, 1969 3 Sheets-Sheet 2

INVENTOR.
Gilbert K. Hause
BY
John P. Moran
ATTORNEY

United States Patent Office 3,564,938
Patented Feb. 23, 1971

3,564,938
TRANSMISSION AND CONTROL
Gilbert K. Hause, Bloomfield Hills, Mich., assignor to General Motors Corporation, Detroit, Mich., a corporation of Delaware
Filed Apr. 11, 1969, Ser. No. 815,422
Int. Cl. F16h *57/10, 47/00*
U.S. Cl. 74—761                                     25 Claims

ABSTRACT OF THE DISCLOSURE

A transmission including a compound planetary gear set having an input sun gear, a reaction sun gear, a ring gear and a plurality of individual pinions mounted in a common output carrier. The pinion arrangement consists of sets of three (3) like individual pinion gears mounted for independent rotation on the common carrier, one of which meshes with the input sun gear, a second of which meshes with the first pinion and the ring gear, and the third of which meshes with the ring gear and the reaction sun gear. In one form, the carrier includes a central plate or hub member which serves to support a common pinion shaft or pin between an aligned pair of pinions, the split pinions and the central support making possible the use of a small diameter pin and, hence, a small diameter planetary gear package. A second pinion arangement may consist of three (3) sets of like pinions, the first of which meshes with the input sun gear, the second of which is mounted on its own pinion shaft, supported by the central hub, and meshes with the first pinion and the ring gear, while the third pinion is mounted on its own shaft and supported by the carrier central hub radially inwardly from the second pinion, while meshing with the reaction sun gear and with a radially inwardly located portion of a stepped or two-diameter ring gear. The resultant stepped split pinion arrangement produces higher low and reverse gear ratios, as well as a more favorable relationship between the two. For both pinion arrangements, low gear ratio is provided by a one-way clutch in automatic low gear, while the reaction sun gear is held. Input during second gear ratio is provided by an additional clutch connecting the ring gear to the input shaft, while reaction is provided by the reaction sun gear. In one form, for third gear ratio, the reaction sun gear is released, and both clutches drive. In another form, a third gear clutch, having parts identical to the second gear clutch, is engaged, locking up the planetary gear set to produce a direct drive and prevent the second gear clutch from being subjected to excessive turbine torque. For reverse, a reverse brake is engaged, causing the ring gear to serve as the reaction member, while the direct clutch is engaged. The engagement of the direct clutch in reverse supplements the input to the gear set through the one-way clutch and prevents freewheeling in reverse gear.

---

This invention relates to automatic transmissions and more particularly to a novel compound planetary gear set therefor.

There is need for a compound planetary gear set for an automatic transmission which consists of a plurality of pinion gears which react with themselves and with input and reaction sun gears and with a ring gear as a compact, economical and efficient unit.

Accordingly, a primary object of this invention is to provide a compound planetary gear set wherein three individual pinions are rotatably mounted on a common carrier, the second and third pinions thereof being mounted on a pin or shaft for independent rotation thereon and tied together by a unitary ring gear assembly, permitting the use of smaller pinion gears and thus reducing the overall planetary gear set diameter, as well as pitch line velocity of the gears and, consequently, reducing gear noise.

A more specific object of the invention is to provide a compound planetary gear set wherein a front or input sun gear is driven by a low gear input one-way or friction clutch, a ring gear having a front portion and an integrally formed rear second ring gear portion is driven by a second input clutch, a rear or reaction sun gear is connected to a brake drum hub which is actuated by a rear brake, a carrier assembly includes a central plate secured to the output shaft and two end plates secured together by a drum, a first planet pinion freely mounted between the front and central end plates meshes with the input sun gear, a second pinion meshes with the first pinion and with the front ring gear portion while a third pinion aligned with and mounted on the same centrally supported pinion shaft as the second pinion meshes with the second ring gear portion and the reaction sun gear.

A still further object of the invention is to provide a modification of the above planetary gear set wherein the unitary ring gears are stepped and the third individual pinion is mounted on a separate pinion shaft radially inwardly of the second pinion shaft, the second and third pinions meshing, respectively, with the outer and inner stepped portions of the ring gear assembly, resulting in a higher gear ratio in low gear, lower pitch line velocity and noise in first gear, and a wider range of available gear ratios than in an equal diameter dual ring gear arrangement.

These and other objects and advantages will become apparent from the following description and accompanying drawings wherein.

Figure 1:
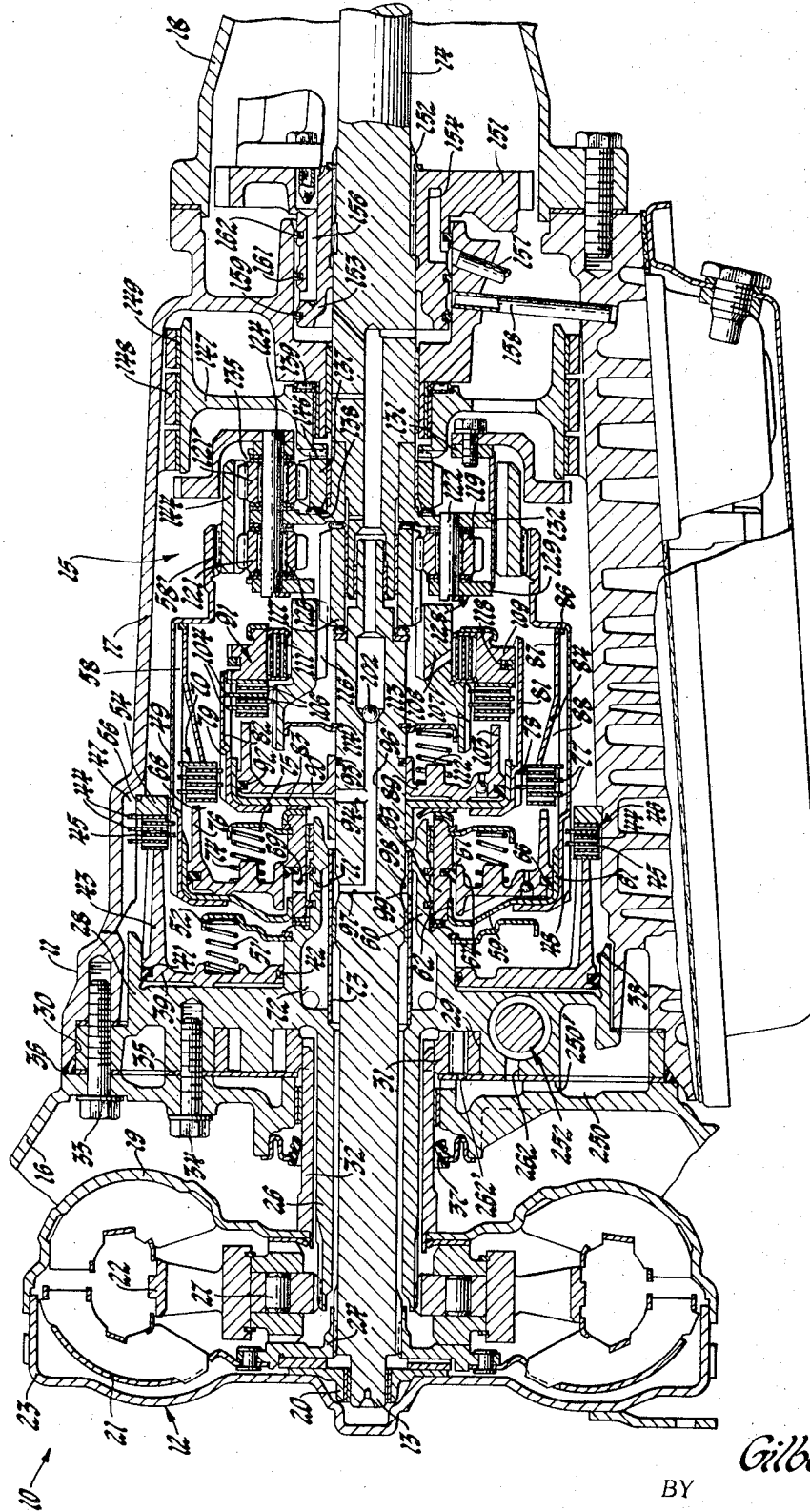
FIG. 1 is a cross-sectional view of a transmission embodying the invention.

Referring to the drawings in greater detail, there is illustrated in FIG. 1 a transmission 10 having a housing 11, a torque converter 12, an input shaft 13, an output shaft 14 and a planetary gear set 15. The housing 11 has three components, a bell housing 16, a gear housing 17, and a rear extension 18. The bell housing 16 is adapted to be secured to an engine and houses the torque converter 12 which includes an impeller 19, a turbine 21, and a stator 22. The impeller 19 has a cover 23 welded thereto which is adapted to be piloted in and connected to the engine flywheel by a flex plate (not shown). The turbine 21 has a hub 24 splined to the input shaft 13 which is rotatably supported by a bearing member 20, welded to cover 23. The stator 22 is supported on a stationary shaft 26 by a one-way brake 27. The torque converter 12 drives in a conventional manner and has a torque multiplication phase and a coupling phase. During the torque multiplication phase, fluid forces on the stator blades are in a rotational direction such that the one-way brake 27 is locked and the stator 22 becomes a fluid reaction member and the turbine rotates at a speed less than the impeller 19 but transmits an increased torque to the input shaft 13. During the coupling phase, the impeller 19, turbine 21 and stator 22 rotate at substantially the same speed to provide a one-to-one torque ratio between the engine and the input shaft 13.

The shaft 26 is an integral extension or part of the front wall 28 of the transmission housing. The wall 28 has an eccentric cavity 29 in which is mounted an internal-external type gear pump 31 which is driven by a pump shaft 32 secured to the impeller 19. Thus the gear pump 31 is rotated at engine speed as is the impeller 19. The front wall 28 fits in a recess 30 in the gear housing 17. The bell housing 16 is secured to the gear housing 17 by a plurality of fasteners 33 to locate and clamp the wall 28 therebetween. A plurality of fasteners 34 secure the wall 28 to the bell housing 16. A sealing ring 36 between the bell housing 16 and the wall 28 prevents the fluid in the pump 31 from leaking radially outward, and a seal member 37 prevents fluid leakage axially along the shaft 32. A wear plate 35, between the bell housing 16 and the wall 28, prevents pump wear of the bell housing and cooperates with recesses in the facing surfaces of the bell housing and wall to provide passages for a portion of the control system. A sump 250 with a screen inlet (not shown) therein is connected by an inlet line 250' to the inlet passage 262 and continued through the wear plate 35 to a crescent-shaped inlet port 262' in the wear plate to the inlet cavity of pump 31. As best shown in FIG. 1, the inlet passage 250' is a recess in the wall 28 covered by the wear plate 35, and the passage 262 is a recess in the rear wall of the converter housing 16 covered by the wear plate 35. An outlet passage is similarly formed in an adjacent plane not shown in section. Also, other passages to the regulator valve and cylinders are similarly formed.

The wall 28 also has an integral annular chamber 38 which houses a reverse brake piston 39 and cooperates therewith to form a fluid motor. A pair of annular seals 41 and 42, mounted in grooves on the piston 39, prevent fluid leakage from the chamber 38 past the piston 39. The piston 39 has an annular extension 43 which abuts a brake or alternate plates 44 and friction or intermediate plates 45 when hydraulic fluid in chamber 38 causes the piston 39 to move to the right. The alternate plates 44 are alternately spaced of intermediate plates 45 such that the plates 44 and 45 and the piston 39 form a plate or brake pack for a reverse brake 46. To increase the torque capacity of the reverse brake 46, the extension 43 may be shortened to permit the addition of more alternate plates 44 and friction plates 45. The alternate plates 44 have external teeth fitting splines 47 formed in the housing 17 and are stationary, while the intermediate plates 45 have internal teeth fitting external splines 48 of a drum 49. Thus when the reverse brake 46 is engaged, the drum 49 is held stationary. A plurality of return springs 51 are mounted between the piston 39 and the spring retainer 52 which is positioned on the wall 28 to provide return motion for the piston 39 when the chamber 38 is not pressurized, thus maintaining the brake 46 in a disengaged position. A backup plate 54 rests against a shoulder 56 formed on the gear housing 17 to limit the rightward movement of the plates 44 and 45 and the piston 39 when the brake 46 is engaged.

The drum 49 is formed from an elongated sheet metal cup having in the cylindrical portion nested external spline teeth 48 and internal spline teeth 58 formed thereon. A hub member 59 is welded or otherwise secured at its flanged end 61 to the apertured cup bottom portion of the drum 49 and at its inner diameter 62 to a sleeve 63 which is rotatably supported in a hub 60 which is an integral extension of the wall 28. An intermediate clutch piston 64 is slidably mounted within the hub 59 and on the sleeve 63. A seal member 66, mounted on the piston 64, prevents fluids leakage between the piston 64 and the hub 59 while a seal 67, mounted in the sleeve 63, prevents fluid leakage between the sleeve 63 and the piston 64. Thus, a fluid chamber 68 is formed in which fluid pressure may be admitted to move the piston 64 to the right to provide a fluid motor to apply the intermediate clutch 70. Fluid pressure is admitted to the chamber 68 through a passage 69 formed in the sleeve 63 and a passage 71 formed in the hub 60 of the wall 28, from a fluid chamber 72 which is a cavity formed between wall 28 and a sleeve 73. A plurality of return springs 74 are compressed between the piston 64 and a spring retainer 75 fixed on the sleeve 63 to urge the piston 64 to its leftward position shown when fluid pressure is not available in the chamber 68, thereby maintaining the intermediate clutch 70 in a disengaged position. The piston 64 has an annular extension 76 at its outer diameter which engages a plurality of alternate or clutch plates 77 which are splined to the drum 49 by the internal teeth 58 thereof and intermediate or fraction plates 78 which are splined on a plurality of external teeth 79 of a drum 81. The alternate plates 77 and the intermediate plates 78 cooperate to form a clutch or plate pack for the clutch 70. The drum 81 is similar in construction to the drum 49, being a cuplike member having an apertured bottom and a single elongated cylinder having nested external spline teeth 79 and internal spline teeth 82 rolled thereon. The major diameter of the internal spline 82 has a greater diameter than the minor diameter of the external spline 79 and the major diameter of the external teeth on the plate 104 meshing with the internal splines 82 has a greater diameter than minor diameter of the internal teeth meshing with the external splines 79. A hub member 83 is welded or otherwise seccured to the flanged face of the drum 81 and the input shaft 13. Thus, when the intermediate clutch 70 is engaged, the drum 49 is drivingly connected to the input shaft 13, and when the reverse brake 46 is actuated the drum 49 is grounded to the gear housing 17. A backup cylinder 84 is located inside the drum between a snap ring 86 and one of the clutch plates 77. The backup cylinder 84 is cylindrical at its right end 87 and is undulated, having wave patterns 88 at its left end. The cylindrical end 87 of the backup cylinder 84 may be shortened to permit additional clutch and friction plates 77 and 78 to be added to the plate pack which will increase the torque capacity of the clutch 70.

Slidably mounted in the hub 83 and on the input shaft 13, is a direct clutch piston 89 which cooperates with the hub 83 to form a chamber 90 and thus provide a motor to apply a direct clutch 91. A seal member 92, held by the piston 89, prevents fluid leakage between the piston 89 and the hub 83 while a seal member 93, mounted on the input shaft 13, prevents leakage between the shaft 13 and the piston 39. Fluid to energize the piston 89, thereby engaging the direct clutch 91, is admitted to the chamber 90 via a radial passage 94, an axial passage 96 and a radial passage 97 which communicates with a chamber 98, formed between the sleeve 73 and the input shaft 13. An opening 99 in the sleeve 73 communicates with the chamber 72 formed between the sleeve 73 and the wall 28. The right end of the passage 96 is closed by a ball 102 which is pressed therein to prevent fluid from escaping. The piston 89 has an annular extension 103 at its outer diameter which is adapted to engage alternate or clutch plates 104 splined to the drum 81 at its inner splines 82 and intermediate or friction plates 106 which are mounted on splines 107 of a hub 108 which provides an inner race for a one-way clutch or sprag 111. The alternate and intermediate plates 104 and 106 cooperate to provide a plate or clutch pack for the direct clutch 91. To increase the torque capacity of the direct clutch 91, the annular extension 103 may be shortened to provide space for additional plates 104 and 106. Also connected to splines 82 is an outer race 109 of the one-way clutch or sprag 111. The outer race 109 also provides a backup plate for the plates 104 and 106 and is held in location on the drum 81 by a snap ring 118 for this purpose. The sprag 111 is so constructed that whenever the input shaft 13 applies a torque to the sprag 111 in the drive direction, the sprag will torsionally lock the outer race 109 to the inner race or hub 108. Also, whenever the direct clutch 91 is engaged, the hub 108 will be driven by both the sprag 111 and the direct clutch 91. A plurality of return springs 112 are compressed between the piston 89 and a spring retainer 113 which is positioned on the input shaft 13 by a snap ring 114 to maintain the direct clutch 91 in its disengaged condition when the chamber 90 is not pressurized. The hub 108 has a spline 116 at its inner diameter which drivingly connects the hub to an input sun gear 117.

Figure 2:
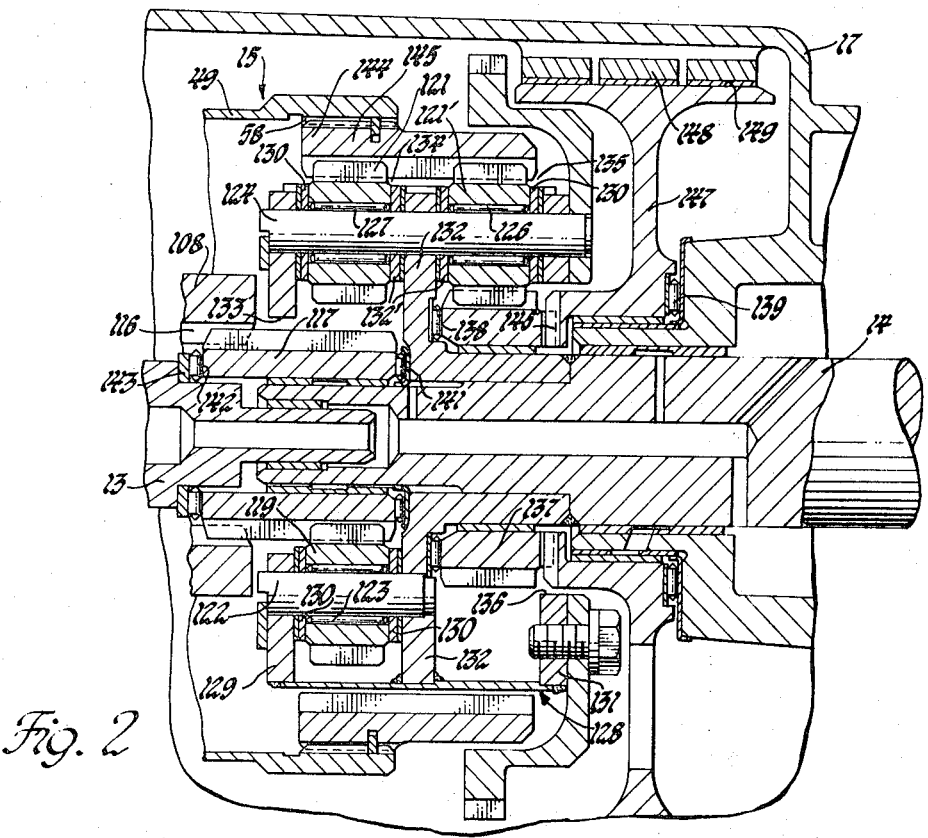
FIG. 2 is a partial enlargement of the compound planetary gear set portion of FIG. 1.

As best seen in FIG. 2, the front or input sun gear 117 meshes with a plurality of pinion gears 119 which, in turn, mesh with a second plurality of pinion gears 121. A third plurality of pinion gears 121' have their axes aligned with the respective axes of the pinion gears 121. The pinions 119, 121 and 121' are all the same gear part and, hence, permit easier manufacture and assembly than has been the case heretofore. The pinions 119 are rotatably mounted on pins 122 by needle bearings 123, while the dual or split pinions 121 and 121' are both rotatably mounted on pins 124 by needle bearings 126 and 127 and are separated from each other by a central hub member 132 and thrust bearings 132'. Both of the pins 122 and 124 are mounted in and secured to an output carrier 128. Thrust bearings, such as 130, are provided adjacent the end faces of the pinion gears 119 and the outer end faces of the pinions 121 and 121' to reduce the friction forces.

It should be apparent that, since the pin 124 is supported at its center by the central hub member 132, and since the pinions 121 and 121' are substantially lighter than one long pinion gear extending over the same overall length, the pin 124 may have a substantially smaller diameter in the split pinion arrangement than a pin in a single long pinion arrangement, without experiencing bearing problems due to deflection of the shaft or pin. It follows that the pitch diameter of the pinions 121 and 121' may be smaller, resulting in the use of a smaller ring gear and, hence, producing a much more compact planetary gear set.

The carrier 128 is formed with two annular cup members 129 and 131 which are welded to the central hub member 132. The latter is secured to the output shaft 14. The cup member 129 is formed from a single piece having a central aperture 133 which permits clearance for the sun gear 117 and a plurality of cutout sections 134 which allow the front pinion 121 to extend outside of the cup member 129 and carrier member 128. The cup member 131 is similar to the cup member 129. It also has cutout sections 135 for the rear pinion 121' and a central aperture 136 which provides clearance for a reaction sun gear 137 which meshes with the rear pinion 121'. The reaction sun gear 137 is splined adjacent one end thereof to a drum 147, and the assembly is supported by a hub formed on the transmission housing by means of a sleeve and bushing. Axial forces at the gear 137 are transmitted via the needle thrust bearings 138 between the hub 132 and the sun gear 137 and via the needle thrust bearings 139 between the drum 147 and the gear housing 17. Thrust forces introduced by or to the input sun gear 117 are transmitted by needle thrust bearings 141 and 142 between the hub 132 of the output shaft 14 and a thrust washer 143 which abuts the input shaft 13. Also meshing with the dual pinions 121 and 121' is an input and reaction ring gear 144 which is drivingly connected by external splines to internal splines 58' of the drum 49 and located axially by snap ring 86. Thus the ring gear 144 will provide a reaction member whenever the brake 46 is engaged or will provide an input member whenever the clutch 70 is engaged. The reaction sun gear 137 has the brake drum 147 splined thereon at 146. A double-wrap brake band 148, wrapped around the outer diameter 149 of the drum 147, provides a reaction connection for the reaction sun gear 137. The double-wrap band 148 may be constructed similar to that shown in U.S. Pat. No. 2,975,870 Vossler et al.

Referring once again to FIG. 1, a parking gear 151 is splined to the output shaft 14 at 152 and includes a hub portion 153 which is rotatably mounted in the gear housing 17 and has a governor inlet passage 154, 157 to a governor (not shown) and a governor outlet passage 156, 158. Three seal rings 159, 161 and 162 separate the fluid in the passage 157 from the fluid in passage 158 and prevent outward leakage of the fluid from the passages 157 and 158.

The transmission is capable of either automatic shifting through three speed ratios or manual ratio change in forward drive. During automatic operation in first gear, the brake band 148 is applied, thus preventing rotation of the reaction sun gear 137. With the brake band 148 applied, the power flow is from the engine through the impeller 19, to the turbine 21, through the input shaft 13, the hub 83, and the drum 81 to the outer race 109 of the sprag or one-way clutch 111. Since the input shaft 13 is applying a torque to the sprag 111 in the drive direction, the sprag 111 will lock the outer race 109 to the inner race 108 so that the inner race 108 and the input sun gear 117 are driven by the input shaft 13. Since the reaction sun gear 137 is stationary, the planet pinions 119, 121 and 121' are urged to "walk-around" or orbit about the reaction sun gear 137, thereby causing the carrier 128 to rotate in the same direction as the input shaft 13, but at a reduced speed and a torque increase. Since the output shaft 14 is secured to the carrier 128, it also rotates in the same direction as the input shaft 13, but at a reduced speed and an increased torque. Also, during initial first gear operation, the stator 22 is stationary to provide additional torque multiplication between the engine and the output shaft 14.

To change from first gear to second gear, the clutch 70 is engaged. Thus the ring gear 144 is connected to the input shaft 13. The brake 148 remains engaged to maintain the sun gear 137 as a reaction member. Thus, as the ring gear 144 is driven by the input shaft 13, the planet pinions 119, 121 and 121' are driven by the ring gear 144 so that they "walk-around" the reaction sun gear 137 driving the carrier 128 with them. During second gear operation, the carrier rotates at a reduced speed, but more rapidly than it did in first gear. Also, during second gear operation, the sun gear 117 is driven by the rotation of the planet pinions 119, 121 and 121' and rotates more rapidly than the input shaft 13. Thus, the inner race 108 of the sprag 111 rotates freely and more rapidly than the outer race 109 so that the sprag 111 is ineffective or in an overrunning condition. During second gear operation, the stator 22 may be either stationary to provide additional torque multiplication or the stator 22 may be "freewheeling" with the torque converter 12 in "coupling phase."

To change from second to third gear, the brake 148 is disengaged and the clutch 91 is engaged, while the clutch 70 remains engaged; thus the input shaft 13 drives the ring gear 144 and the sun gear 117. The planetary gear set 15 is then in a locked-up condition and rotates in the same direction as the input shaft 13 and at the same speed to drive the output shaft 14 in the same direction at the same speed.

In low gear manual operation, the brake 148 is engaged and the clutch 91 is engaged. Thus the power path is the same as in automatic first gear except that the power flow is through the sprag 111, or through both the clutch 91 and the sprag 111 in parallel, to the sun gear 117. However, when the clutch 91 is engaged, a two-way connection is provided between the engine and the sun gear 117 so that engine braking is available in manual first gear. The transmission may be manually shifted from first to second gear disengaging the clutch 91 while engaging the clutch 70.

For reverse gear operation, the reverse brake 46 is engaged thus establishing the ring gear 144 as the reaction member of the planetary gear set 15, and the clutch 91 is engaged to prevent freewheeling of the sprag 111 in reverse during coasting. The planet pinions 119, 121 and 121', driven by the sun gear 117, orbit within the inside of the ring gear 144 in a direction opposite to the rotation of the input sun gear 117, thereby driving the carrier 128 and the output shaft 14 in a direction opposite to the input shaft 13.

Each of the above-described clutches and brakes has a set of plates or a band providing a friction torque device. Each friction torque device and its operating motor provides a friction torque-establishing device.

The intermediate and direct clutches 70 and 91 and the reverse and low brakes 46 and 148 are actuated by fluid pressure supplied by a hydraulic control system, not shown herein but illustrated and described in copending United States application, Ser. No. 759,671, filed on Sept. 13, 1968, in the names of Charles R. Moore, Raymond P. Michnay and Gilbert K. Hause. The internal-external gear pump 31 receives fluid from the sump 250 via suction line 250', and inlet passage 262 and delivers fluid to the control system. The pressure level of this fluid is established by a main pressure regulator valve 252.

Figure 3:
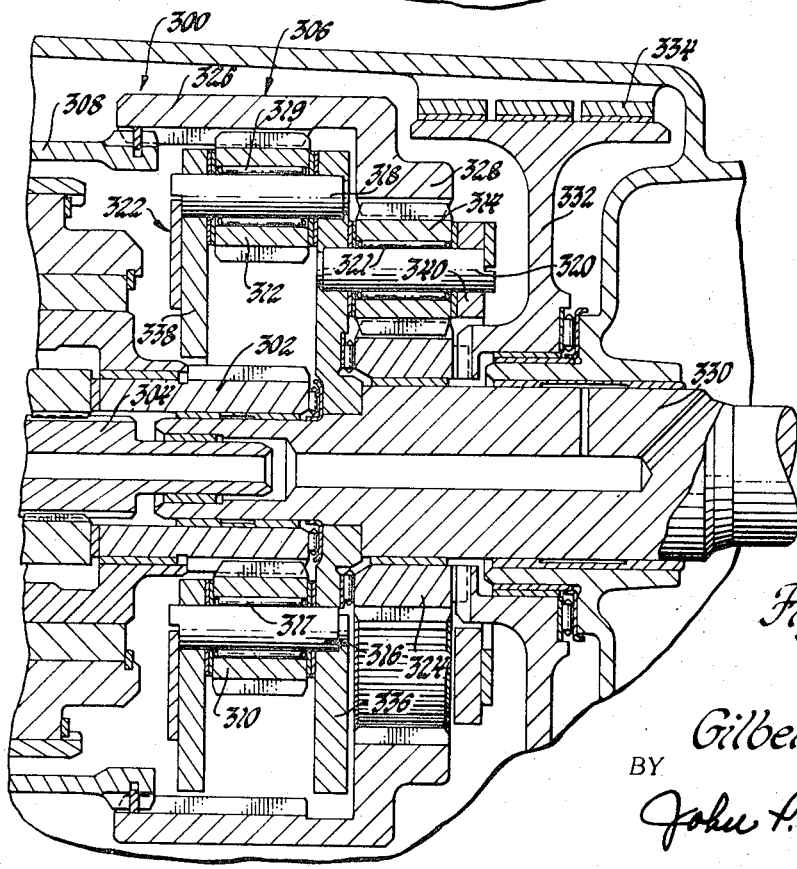
FIG. 3 is a cross-sectional view of a modification of the planetary gear set shown in FIG. 1.

The planetary gearing illustrated in FIG. 3 is a modification of that shown in FIGS. 1 and 2. The planetary gearing 300 includes an input sun gear 302 rotatably journaled on an input shaft 304, an input-reaction ring gear assembly 306 splined at one end thereof to a drum 308, a plurality of intermeshing pinions 310 and 312, a third set of pinions 314, the pinions 310, 312 and 314 being rotatably mounted on pinion shafts 316, 318 and 320, by needle bearings 317, 319 and 321, respectively, the shafts 316, 318 and 320 being secured to a three-piece carrier assembly 322, and a reaction sun gear 324.

The ring gear assembly 306 includes a front ring gear portion 326 which, in addition to being splined to the drum 308, meshes with the second pinion 312, and an integral rear ring gear portion 328 which is smaller in diameter than the front ring gear portion 326 and meshes with the third pinion 314. The latter pinion 314, in turn, meshes with the reaction sun gear 324, the sun gear being mounted on the output shaft 330 and splined at one end face thereof to a brake drum 332 which is encircled by a double-wrap brake band 334, the latter being selectively engageable to at times prevent rotation of the reaction sun gear 324.

The carrier assembly 322 includes a central hub section 336 to which one end of each of the pinion shafts 316, 318 and 320 is secured, and end sections 338 and 340. The other end of each of the shafts 316 and 318 is secured to the end section 338, while the other end of the shaft 320 is secured to the end section 340.

The use of the stepped split pinion gear arrangement just described results in a wider range of available gear ratios, as compared to the axially aligned pinion arrangement described above, inasmuch as some reduction or multiplication would be inherent in the smaller diameter or fewer teethed ring gear, while some reduction or multiplication would be inherent in the sun gear. For example, while the second gear ratio remains the same in both arrangements, the stepped split pinion arrangement produces a higher low gear ratio, as well as a higher reverse gear ratio, the latter having a more favorable relationship with the low gear ratio than in the aligned pinion arrangement.

In other words, while second gear ratio means, for example, at 1.549:1, the low gear ratio in the stepped split pinion arrangement may increase from 2.48:1 to 2.885:1, while the reverse gear ratio increases substantially from 1.7:1 to 2.44:1. It is known by those skilled in the art that the closer the low gear and reverse gear ratios are to each other, the better, i.e., it is highly desirable to have equal traction capabilities for both forward and backward vehicle operations.

Figure 4:
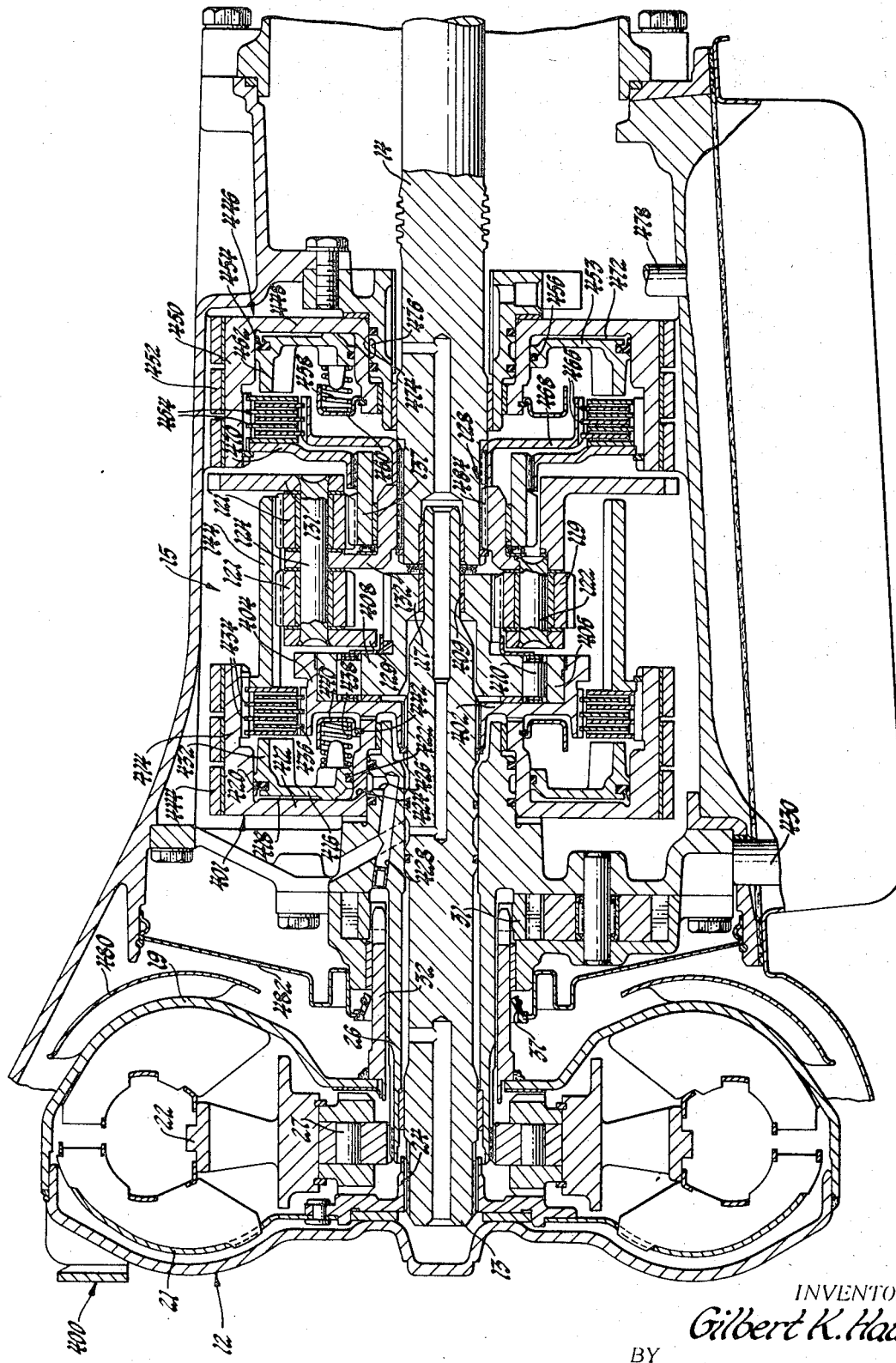
FIG. 4 is a cross-sectional view of a modification of the FIG. 1 structure.

FIG. 4 illustrates a modification of the transmission shown in FIG. 1 and includes the planetary gear structure of FIG. 2. Those elements which are the same as corresponding elements in the FIG. 1 structure are identified by the same reference numerals, for example, the torque converter 12 and its components, as well as the input shaft 13, output shaft 14, as well as the planetary gear set 15 components. In the FIG. 4 embodiment, the clutch arrangements have been substantially simplified in order to utilize as many identical parts as possible to minimize tooling and manufacturing costs and the cost of stocking repair parts, and to produce a very compact and yet highly efficient automatic transmission, particularly for use in smaller vehicles.

The transmission 400 illustrated in FIG. 4 further includes a second gear clutch assembly 401, having a hub 402 splined to the input shaft 13, an integral, cylindrical drum 404 formed at the outer periphery of the hub 402, an outer race 406 secured to the inside surface of the drum 404, an inner race 408 formed integral with the input sun gear rotatably mounted on the input shaft 13, and a one-way roller clutch 410 mounted between the outer and inner races 406 and 408. A second hub 412 is formed integral with the hub 402 and a drum 414 is formed on the outer periphery thereof.

A direct clutch piston 416 is slidably mounted in the drum 414 of the hub 412, forming a variable chamber 418 therewith, thereby providing a motor to apply a direct clutch. Seal members 420 and 422 mounted around the piston 416 prevent fluid leakage between the piston and the drum 414. Fluid to energize the piston, and thereby engage the direct clutch, is admitted to the chamber 418 via a plurality of passages 424, 426, 428 and 430.

The piston 416 has an annular extension 432 formed at its outer diameter which is adapted to engage clutch plates 434 splined to the drum 414 at its inner splines and friction plates 436 which are mounted on outer splines formed on the drum 404. The clutch and friction plates 434 and 436 cooperate to provide a plate or clutch pack for the direct clutch. The roller clutch 410 is so constructed that whenever the input shaft 13 applies a torque thereto in the drive direction, the roller clutch 410 will torsionally lock the outer race 406 to the inner race 408. Whenever the direct clutch is engaged, the input sun gear 117, mounted on a bearing 409 on the input shaft 13 in the FIG. 4 structure, will be driven by both the roller clutch 410 and the direct cltuch 434/436. A plurality of return springs 438 are compressed between the piston 416 and a spring retainer 440 which is positioned on the hub 412 by a snap ring 442 to maintain the direct clutch in its disengaged condition when the chamber 418 is not pressurized.

A double-wrap brake band 444, wrapped around the outer diameter of the drum 414, provides a reaction connection for the ring gear 144 which is fitted at its one end between the inner splines of the drum 414.

A third gear clutch assembly 446 has parts identical to the second gear clutch assembly 401 but is assembled as an opposite hand assembly. In other words, the hub 448, the brake band 452, the piston 453, the seals 454 and 456, the spring 458, the spring retainer 460, and the clutch plates 464 and 466 are identical but assembled in the opposite hand configuration of their counterparts in the second gear clutch assembly 401 and are mounted adjacent the end of the planetary gear set 15 opposite the second gear clutch assembly 401. The clutch discs 464 are mounted for rotation with the splines formed on the inside surface of the drum 450, while the clutch plates 466 are mounted for rotation with splines formed on a hub 468 which is secured to the output shaft 14. Another hub 470 is splined to the reaction sun gear 137 at its inner edge and connected for rotation with the splines of the drum 450 at its outer edge. Fluid to energize the piston 453 so as to engage the clutch 464/466, is admitted to the variable chamber 472 via passages 474, 476 and 478.

A baffle 480 may be secured to the impeller 19 of the torque converter 12 to serve as a centrifugal air pump, in conjunction with a wall member 482, for moving air radially outwardly around the impeller 19 to cool the oil therein.

Insofar as the operation of the FIG. 4 structure is concerned, during automatic operation in first gear, the brake band 452 is applied, thus preventing rotation of the reaction sun gear 137 through the hub 470. With the brake 452 applied, the power flow is from the engine, through the impeller 19 to the turbine 21, through the input shaft 13, the hub 402 and the drum 404 to the outer race 406 of the one-way roller clutch 410. Since the input shaft 13 is applying a torque to the roller clutch 410 in the drive direction, the clutch 410 will lock the outer race 406 to the inner race 408 so that the inner race and its associated input sun gear 117 are driven by the input shaft 13. Since the reaction sun gear 137 is stationary, the planet pinions 119, 121 and 121' are urged to "walk-around" or orbit about the reaction sun gear 137, thereby causing the carrier 128 to rotate in the same direction as the input shaft 13, but at a reduced speed and a torque increase. Since the output shaft 14 is secured to the carrier 128, as at 484, it also rotates in the same direction as the input shaft 13, but at a reduced speed and an increased torque. Also, during initial first gear operation, the stator 22 is stationary to provide additional torque multiplication between the engine and the output shaft 14.

To change from first gear to second gear, the clutch 434/436 is engaged, thereby connecting the ring gear 144 to the input shaft 13. The brake 452 remains engaged to maintain the sun gear 137 as a reaction member. Thus, as the ring gear 144 is driven by the shaft 13, the planet pinions 119, 121 and 121' are driven by the ring gear 144 so that they "walk around" the reaction sun gear 137, driving the carrier 128 with them. During second gear operation, the carrier 128 rotates at a reduced speed, but more rapidly than it did in first gear. Also, during second gear operation, the input sun gear 117 is driven by the rotation of the planet pinions 119, 121 and 121' and rotates more rapidly than the input shaft 13. Thus, the inner race 408 of the roller clutch 410 rotates freely and more rapidly than the outer race 406, causing the roller clutch 410 to be ineffective or in an overrunning or freewheeling condition. During second gear operation, the stator 22 may be either stationary to provide additional torque multiplication, or it may be freewheeling with the torque converter 12 in "coupling phase."

To change from second to third gear, the rear brake band 452 is disengaged, and the third gear clutch 464/466 is engaged, causing the reaction sun gear 137 and the output shaft 14 to be rotated by their respective hubs 470 and 468 at the same speed. The second gear clutch 401 remains engaged, and turbine torque remains on the ring gear 144. Since the reaction sun gear 137 is, in effect, secured to the output shaft 14, the planetary gear set 15 is in a locked-up condition, rotating in the same direction as the input shaft 13 and at the same speed to drive the reaction sun gear 137 and the output shaft 14 in the same direction at the same speed. It may be noted that this arrangement eliminates control problems in that the second gear clutch 401 continues to be subjected to turbine torque during third gear operation, rather than having to be subjected to, say, 150% of turbine torque, resulting from "clutching-up" or engaging a positive or input member, rather than a negative or reaction member. Hence the problem of second gear clutch slippage in third gear operation is eliminated, along with the need for extra regulating valves which would be required in the above-mentioned undesirable 150% calibration condition.

For reverse gear operation, the front brake band 444 is engaged, thus establishing the ring gear 144 as a reaction member of the planetary gear set 15. The rear clutch 446 is disengaged. The planet pinions 119, 121 and 121', driven by the input sun gear 117, orbit within the inside of the ring gear 144 in a direction opposite to the rotation of the input sun gear 117, thereby driving the carrier 128 and the output shaft 14 in a direction opposite to that of the input shaft 13.

It should be apparent that the stepped, split planetary gear set illustrated in FIG. 3 could be substituted for the planetary gear set illustrated in FIG. 4, with the above-described advantages thereof.

Two transmission embodiments and two planetary gear set embodiments therefor have been shown and described, and other modifications thereof are possible.

What is claimed is:

1. In a transmission having an input element and an output element, a planetary gear mechanism operatively connected between said elements and adapted to provide a plurality of variable gear ratios, said mechanism comprising first, second and third central gear members, first, second and third individual pinions, said first pinion meshing with said first central gear, said second pinion meshing with said first pinion and with said second central gear, said third pinion meshing with said second and third central gears, a common carrier member having means for independently rotatably supporting said first, second and third pinions, one of said central gear and common carrier members being connected to said output element, first clutch means operatively connecting a second of said central gear and common carrier members to said input element, brake means for selectively preventing rotation of a third of said central gear and common carriers members to establish a power train including said first clutch means for providing one of said gear ratios, and second clutch means operatively connecting a fourth of said central gear and common carrier members to said input element to establish a power train providing another of said gear ratios.

2. In a transmission having an input element and an output element, a planetary gear mechanism operatively connected between said elements and adapted to provide a plurality of variable gear ratios, said mechanism comprising first, second and third central gear members, first, second and third individual pinions, said first pinion meshing with said first central gear, said second pinion meshing with said first pinion and with said second central gear, said third pinion meshing with said second and third central gears, a common carrier member having means for independently rotatably supporting said first, second and third pinions, one of said central gear and common carrier members being connected to said output element, first clutch means operatively connecting one of said first, second and third central gears to said input element, brake means for selectively preventing rotation of another of said central gear and common carrier members to establish a power train including said first clutch means for providing one of said gear ratios, and second clutch means operatively connecting one of said second and third central gears to said input element to establish a power train providing another of said gear ratios.

3. The transmission described in claim 2, wherein said first, second and third individual pinions are identical.

4. The transmission described in claim 2, and third clutch means operatively connected to said third central gear for causing said third central gear and said output member to rotate together to attain the third of said gear ratios when said brake means is inoperative.

5. The transmission described in claim 2, and second brake means operatively connected to one of said first and second central gears for selectively preventing rotation of said one of said first and second central gears while said first clutch means is operative to reverse the direction of rotation of said output member.

6. In a transmission having an input member and an output member, a planetary gear mechanism operatively connected between said members and adapted to provide a plurality of variable gear ratios, said mechanism comprising an input sun gear and a reaction sun gear, a ring gear, a first pinion meshing with said input sun gear, a second pinion meshing with said first pinion and with said ring gear, a third pinion meshing with said ring gear and with said reaction sun gear, a common carrier member for supporting said first, second and third pinions, said carrier member being connected to said output member, first clutch means adapted to operatively connect said input sun gear to said input member, brake means for selectively preventing rotation of said reaction sun gear to establish a power train including said first clutch means for providing one of said gear ratios, and second clutch means operatively connecting said ring gear to said input member to establish a power train providing a second of said gear ratios while said brake means is still operative.

7. The transmission described in claim 6, wherein said first, second and third pinions are identical.

8. The transmission described in claim 6, and third clutch means operatively connected to said reaction sun gear for causing said reaction sun gear and said output member to rotate together to attain the third of said gear ratios when said brake means is inoperative.

9. The transmission described in claim 6, and second brake means operatively connected to said ring gear for selectively preventing rotation of said ring gear while said first clutch means is operative to reverse the direction of rotation of said output member.

10. In a transmission having an input member and an output member, a planetary gear mechanism operatively connected between said members and adapted to provide a plurality of variable gear ratios, said mechanism comprising an input sun gear and a reaction sun gear, a ring gear, a pinion meshing with said input sun gear, a pair of pinions axially aligned on one pinion shaft and both meshing with said ring gear, the first of said pair of pinions meshing with said first-mentioned pinion and the second of said pair of pinions meshing with said reaction sun gear, a common carrier member for supporting said first, second and third pinions, said carrier member being connected to said output member, first clutch means operatively connecting said input sun gear to said input member, brake means for selectively preventing rotation of said reaction sun gear to establish a power train including said first clutch means for providing one of said gear ratios, and second clutch means operatively connecting said ring gear to said input member to establish a power train providing a second of said gear ratios while said brake means is still operative.

11. In a transmission having an input member and an output member, a planetary gear mechanism operatively connected between said members and adapted to provide a plurality of variable gear ratios, said mechanism comprising an input sun gear and a reaction sun gear, a first pinion meshing with said input sun gear, a stepped ring gear, a second pinion meshing with said first pinion and with the larger diameter portion of said ring gear, a third pinion meshing with the smaller diameter portion of said ring gear and with said reaction sun gear, a common carrier member for supporting said first, second and third pinions, said carrier member being connected to said output member, first clutch means operatively connecting said input sun gear to said input member, brake means for selectively preventing rotation of said reaction sun gear to establish a power train including said first clutch means for providing one of said gear ratios, and second clutch means operatively connecting said ring gear to said input member to establish a power train providing a second of said gear ratios while said brake means is still operative.

12. A transmission including housing means, input means, output means, gear means drivingly connected to said housing means, said gear means including an input sun gear, a reaction sun gear, a ring gear, and first, second and third pinions, first drum means drivingly connected to said input means and having inner and outer drive connecting means, second drum means drivingly connected to said ring gear and rotatably supported on said housing means and having inner and outer drive connecting means, first multiple disc clutch means selectively drivingly connectable between said input sun gear and said inner drive connecting means of said first drum means, said first pinion meshing with said input sun gear and said ring gear, said second pinion meshing with said ring gear, said third pinion meshing with said second pinion and said reaction sun gear, second multiple disc clutch means selectively drivingly connectable between said outer drive connecting means of said first drum means and said inner drive connecting means of said second drum means, multiple disc brake means selectively operatively connectable between said housing means and said outer drive connecting means of said second drum means, third drum means connected to said reaction sun gear and rotatably supported on said housing means, and brake band means operatively connected to said third drum means for providing a reaction connection for said reaction sun gear.

13. The transmission described in claim 12, wherein said second and third pinions are coaxially aligned on one pinion shaft.

14. The transmission described in claim 12, wherein said ring gear includes internal gear teeth formed on first and second diameters, said second pinion meshing with said first diameter gear teeth and said third pinion meshing with said second diameter gear teeth, said second and third pinions being mounted on separate pinion shafts.

15. In a transmission, an input member, an output member, a planetary gear unit having an input sun gear and a reaction sun gear, a first pinion meshing with said input sun gear, a second pinion meshing with said first pinion, a third pinion axially aligned with said second pinion and meshing with said reaction sun gear, a ring gear meshing with said second and third pinions, a carrier rotatably mounting said first, second and third pinions and attached to said output member, an inner drum having external splines and operatively connected to said input sun gear, an intermediate drum having internal and external splines and operatively connected to said input member, an outer drum having internal and external splines and operatively connected to said ring gear, an outermost fixed internally splined drum, a first fluid operated brake operable to hold said reaction sun gear, a first clutch having alternate plates splined to said intermediate drum and intermediate plates splined to said inner drum and a first small area fluid motor within the intermediate drum, a second clutch having alternate plates splined to said outer drum and intermediate plates splined to said intermediate drum and a second larger area fluid motor within the outer drum, a second fluid operated brake having alternate plates splined to said outermost drum and intermediate plates splined to said outer drum, each alternate plate and each intermediate plate has an outer diameter fitting within the inner diameter of the next larger plate.

16. In a transmission, input means including an input shaft and an input drum fixed for rotation with said input shaft, output means including a planetary carrier, an input sun gear, a first pinion rotatably mounted on a first shaft on said carrier and meshing with said sun gear, second and third pinions rotatably mounted on a second shaft on said carrier, said second pinion meshing with said first pinion, a reaction sun gear meshing with said third pinion, a ring gear meshing with said second and third pinions, brake means for retarding said reaction sun gear, a sun gear drum drivingly connected to said input sun gear and extending between said input drum and said input shaft, a one-way clutch drivingly connecting said input means and said input sun gear, a first fluid operated friction clutch means selectively operable for connecting said input drum and said sun gear drum having alternate plates connected to said input drum and said sun gear drum and a cylinder between said input shaft and input drum having a piston therein engaging said plates, a ring gear drum operatively connected to said ring gear and extending beyond said input drum, a second fluid operated clutch means selectively operable for connecting said input drum to said ring gear drum including a plurality of plates with alternate plates connected to said input drum and said ring gear drum, a cylinder within said ring gear drum and a piston in said cylinder operable to engage said second clutch plates, and fluid operated brake means operatively connected to said ring gear drum for retarding said ring gear drum.

17. In a transmission, an input member, an output member, a planetary gear unit having an input sun gear and a reaction sun gear, a first pinion meshing with said input sun gear, a second pinion meshing with said first pinion, a third pinion positioned radially inwardly from said second pinion and meshing with said reaction sun gear, a two-diameter ring gear meshing with said second and third pinions, a carrier rotatably mounting said first, second and third pinions and attached to said output member, an inner drum having external splines and operatively connected to said input sun gear, an intermediate drum having internal and external splines and operatively connected to said input member, an outer drum having internal and external splines and operatively connected to said ring gear, an outermost fixed internally splined drum, a first fluid operated brake operable to hold said reaction sun gear, a first clutch having alternate plates splined to said intermediate drum and intermediate plates splined to said inner drum and a first small area fluid motor within the intermediate drum, a second clutch having alternate plates splined to said outer drum and intermediate plates splined to said intermediate drum and a second larger area fluid motor within the outer drum, a second fluid operated brake having alternate plates splined to said outermost drum and intermediate plates splined to said outer drum, each alternate plate and each intermediate plate has an outer diameter fitting within the inner diameter of the next larger plate.

18. In a transmission, input means including an input shaft and an input drum fixed for rotation with said input shaft, output means including a planetary carrier, an input sun gear, a first pinion rotatably mounted on a first shaft on said carrier and meshing with said sun gear, a second pinion rotatably mounted on a second shaft on said carrier and meshing with said first pinion, a third pinion rotatably mounted on a third shaft on said carrier, a reaction sun gear meshing with said third pinion, a two-diameter ring gear meshing with said second and third pinions, brake means for retarding said reaction sun gear, a sun gear drum drivingly connected to said sun gear and extending between said input drum and said input shaft, a one-way clutch drivingly connecting said input means and said input sun gear, a first fluid operated friction clutch means selectively operable for connecting said input drum and said sun gear drum having alternate plates connected to said input drum and said sun gear drum and a cylinder between said input shaft and input drum having a piston therein engaging said plates, a ring gear drum operatively connected to said ring gear and extending beyond said input drum, a second fluid operated clutch means selectively operable for connecting said input drum to said ring gear drum including a plurality of plates with alternate plates connected to said input drum and said ring gear drum, a cylinder within said ring gear drum and a piston in said cylinder operable to engage said second clutch plates, and fluid operated brake means operatively connected to said ring gear drum for retarding said ring gear drum.

19. In a transmission having an input member and an output member, a planetary gear mechanism operatively connected between said members and adapted to provide a plurality of variable gear ratios, said mechanism comprising an input sun gear and a reaction sun gear, a ring gear, a first pinion meshing with said input sun gear, a second pinion meshing with said first pinion and with said ring gear, a third pinion meshing with said ring gear and with said reaction sun gear, a common carrier member for supporting said first, second and third pinions, said carrier member being connected to said output member, one-way clutch means for operatively connecting said input sun gear to said input member, brake means for selectively preventing rotation of said reaction sun gear to establish a power train including said one-way clutch means for providing one of said gear ratios, first friction clutch means for operatively connecting said ring gear to said input member to establish a power train providing a second of said gear ratios while said brake means is still operative, and second friction clutch means for causing said reaction sun gear and said output member to rotate together to attain the third of said gear ratios when said brake means is inoperative.

20. The planetary gear mechanism described in claim 19, wherein said second and third pinions are axially aligned on one pinion shaft and said carrier member includes a central hub portion for rotatably supporting said one pinion shaft.

21. The planetary gear mechanism described in claim 19, wherein said ring gear includes a stepped configuration, said second pinion meshing with the larger diameter portion of said stepped ring gear, and said third pinion meshing with the smaller diameter portion of said stepped ring gear.

22. In a transmission having an input element and an output element, a planetary gear mechanism operatively connected between said members and adapted to provide a plurality of variable gear ratios, said mechanism comprising first, second and third central gear members, first, second and third individual pinions, said first pinion meshing with said first central gear, said second pinion meshing with said first pinion and with said second central gear, said third pinion meshing with said second and third central gears, a common carrier member having means for independently rotatably supporting said first, second and third pinions, one member being connected to said output element.

23. In a transmission having an input member and an output member, a planetary gear unit operatively connected between said members and adapted to provide a plurality of variable gear ratios, said unit comprising an input sun gear and a reaction sun gear, a ring gear, a first pinion meshing with said input sun gear, a second pinion meshing with said first pinion and with said ring gear, a third pinion meshing with said ring gear and with said reaction sun gear, a common carrier member for supporting said first, second and third pinions, said carrier member being connected to said output member and including front, rear and central hub portions for rotatably supporting said first, second and third pinions.

24. In a transmission having an input member and an output member, a planetary gear unit operatively connected between said members and adapted to provide a plurality of variable gear ratios, said unit comprising an input sun gear and a reaction sun gear, a ring gear, a pinion meshing with said input sun gear, a pair of pinions axially aligned on one pinion shaft and both meshing with said ring gear, the first of said pair of pinions meshing with said first-mentioned pinions and the second of said pair of pinions meshing with said reaction sun gear, a common carrier member for supporting said first, second and third pinions, said carrier member being connected to said output member and including a central hub portion for rotatably supporting said one pinion shaft.

25. In a transmission having an input member and an output member, a planetary gear unit operatively connected between said members and adapted to provide a plurality of variable gear ratios, said unit comprising an input sun gear and a reaction sun gear, a first pinion meshing with said input sun gear, a stepped ring gear, a second pinion meshing with said first pinion and with the larger diameter portion of said stepped ring gear, a third pinion meshing with the smaller diameter portion of said stepped ring gear and with said reaction sun gear, a common carrier member for supporting said first, second and third pinions, said carrier member being connected to said output member and including front, rear and central hub portions for rotatably supporting said first, second and third pinions.

References Cited

UNITED STATES PATENTS

| | | | |
|---|---|---|---|
| 3,088,339 | 5/1963 | Black | 74—760X |
| 3,095,755 | 7/1963 | Daffy | 74—761X |
| 3,355,966 | 12/1967 | Boehm | 74—761X |

ARTHUR T. McKEON, Primary Examiner

U.S. Cl. X.R.

74—732